(12) United States Patent
Shuster

(10) Patent No.: US 7,970,378 B2
(45) Date of Patent: *Jun. 28, 2011

(54) VERIFYING GEOGRAPHICAL LOCATION OF WIDE AREA NETWORK USERS

(75) Inventor: Gary Stephen Shuster, Fresno, CA (US)

(73) Assignee: Hoshiko LLC, Henderson, NV (US)

( * ) Notice: Subject to any disclaimer, the term of this patent is extended or adjusted under 35 U.S.C. 154(b) by 1039 days.

This patent is subject to a terminal disclaimer.

(21) Appl. No.: 11/737,587

(22) Filed: Apr. 19, 2007

(65) Prior Publication Data

US 2007/0213032 A1    Sep. 13, 2007

Related U.S. Application Data

(63) Continuation of application No. 11/126,045, filed on May 9, 2005, now Pat. No. 7,218,914, which is a continuation of application No. 09/938,137, filed on Aug. 23, 2001, now Pat. No. 6,895,236.

(60) Provisional application No. 60/227,343, filed on Aug. 23, 2000.

(51) Int. Cl.
*H04M 1/66* (2006.01)
(52) U.S. Cl. .................................... 455/410; 455/456.1
(58) Field of Classification Search .......... 455/409–411, 455/456.1–456.5
See application file for complete search history.

(56) References Cited

U.S. PATENT DOCUMENTS

| | | | |
|---|---|---|---|
| 6,173,172 B1 | 1/2001 | Masuda et al. | |
| 6,178,510 B1 * | 1/2001 | O'Connor et al. | 726/5 |
| 6,484,260 B1 * | 11/2002 | Scott et al. | 713/186 |
| 6,965,868 B1 | 11/2005 | Bednarek | |
| 2001/0039210 A1 | 11/2001 | St. Denis | |
| 2003/0008672 A1 | 1/2003 | Fuji | |
| 2003/0134645 A1 | 7/2003 | Stern et al. | |
| 2003/0200179 A1 * | 10/2003 | Kwan | 705/65 |
| 2004/0047287 A1 | 3/2004 | Tremblay et al. | |
| 2005/0251440 A1 | 11/2005 | Bednarek | |

* cited by examiner

*Primary Examiner* — Creighton Smith
(74) *Attorney, Agent, or Firm* — Knobbe Martens Olson & Bear, LLP

(57) ABSTRACT

A method for verifying a purported location of a wide area network user is disclosed. The method comprises the steps of receiving information from a user via a wide area network, including a purported geographical location of the network user. A first network address from which the information is received is recoded, and an access code is generated and recorded. The access code is broadcast in a defined region that includes the purported geographical location of the user. A user access code is then received via the wide area network from the user. The user access code is compared with the access code broadcast in a defined region, and the first network address is compared to a second network address from which the user access code is received. If the codes and addresses match, the geographical location of the user is considered verified and the user may be validated. Various methods for broadcasting the access code and various systems for implementing the method are disclosed.

35 Claims, 3 Drawing Sheets

VERIFYING GEOGRAPHICAL LOCATION OF WIDE AREA NETWORK USERS

CROSS-REFERENCE TO RELATED APPLICATION

This application is a continuation of application Ser. No. 11/126,045, filed May 9, 2005, now U.S. Pat. No. 7,218,914 which is a continuation of application Ser. No. 09/938,137 filed Aug. 23, 2001, now Pat. No. 6,895,236, which claims priority pursuant to 35 U.S.C. §119(e) to U.S. Provisional Application Ser. No. 60/227,343 filed Aug. 23, 2000, which applications are specifically incorporated herein, in their entirety, by reference.

BACKGROUND OF THE INVENTION

1. Field of the Invention

The present invention relates to methods for communicating using a wide area network, and particularly to a method for verifying a geographical location of a user of a wide area network.

2. Description of Related Art

Wide area networks, such as the Internet, are particularly useful for facilitating communications between strangers in remote geographical locations. In recent years, this capability has led to an increasing amount of commercial and non-commercial business being transacted over wide area networks. The parties to these transactions often know little about each other except for information such as the parties voluntarily share over the wide area network. In particular, the parties transact in a virtual space wherein their physical location is unknown or not readily ascertainable. The anonymity of transacting in a virtual space is sometimes undesirable.

For example, users may sometimes misrepresent their location for the purposes of committing fraud. One method of reducing fraud and misrepresentation is to verify the physical or geographical location of the party in question. For example, a user who claims to be John Doe of Des Moines might be suspected of misrepresentation if the user's location cannot be verified to be physically located in the Des Moines area. Additionally, it is often desirable for merchants to verify the location of a customer before completing a transaction, to ensure compliance with import/export, censorship, tax, and other laws that may apply to a particular transaction. The applicability of such laws often depends on the residency or location of the customer, but according to prior art methods, there is often no reliable, cost-effective way to verify the customer's actual location.

It is desirable, therefore, to provide a method and system for quickly and easily verifying geographical or physical locations of wide area network users.

SUMMARY OF THE INVENTION

The present invention provides a method and system for quickly verifying a geographical location of a user of a wide area network. The method is particularly useful for verifying the location of users seeking to register themselves with merchants and membership organizations on a wide area network. That is, merchants and organizations may find it advantageous to employ the method prior to assigning an account to a new customer or member. Other applications may include verifying the location of members seeking to access highly protected, sensitive information via a wide area network.

According to an embodiment of the invention, the method is used to verify the location of a wide area network user connecting to the network through a network address. For example, when the wide area network is the Internet, the connection address may consist of a 12-digit Internet Protocol (IP) address. A receiving party, such as a merchant or organization, receives a request for access from the user, and records the user's network address. The user also supplies a purported location, such as a home address, to the receiving party. The receiving party then uses a signal of limited range to transmit an access code to the user. The limited-range signal is broadcast only within a limited geographical area including the area that the user purports to be in. Preferably, the broadcast area is made as small as possible without excluding the user's purported location. If the user is actually at the purported location, the user will receive the signal and the access code transmitted thereby. Otherwise, the users will not receive the access code. After receiving the access code, the user is able to use the access code to gain access to the desired wide area network merchant or other host site by transmitting the access code back to the host through the user' network connection. If the access code is received from the user's recorded network address within a short period after transmission, the host, in turn, has effectively verified that the user is located at or near the user's purported location.

Any distributed network of transmitters may be used to transmit the access code. Preferably, each transmission of an access code requires a single transmitter of the network. For example, transmitters used in cellular phone networks may be used for transmitting the limited-range signal, utilizing the network of closely spaced transmission towers that already exists in most populous areas. The transmission tower closest to the user's purported location can quickly be determined, and a signal of limited range can be transmitted from the closest tower. Similarly, the access code may be broadcast using a telephone paging network, a broadcast, cable, or satellite television network, an AM radio, FM radio, VHF, UHF, or other transmission network capable of directing a signal within a designated area.

The network user receives the transmitted code using a device suitable for receiving the transmitted signal. Suitable devices may include a general-purpose cellular phone or pager, television receiver, or radio receiver. For example, the code may be transmitted as a message to the user's cell phone or pager. In the alternative, the user may tune a television or cell phone to a designated frequency and receive the access code by watching or listening to a list. Because the access code will not function unless supplied through the requesting user's original network location, a public access code cannot be used by an another user. Additionally, each access code is preferably assigned a limited life or period in which the code will be accepted as valid, further reducing the possibility for misuse. To reduce the likelihood that the access code may be successfully guessed, each access code is preferably a randomly selected sequence of information of variable length.

In an embodiment of the invention, the user's reception device is a specialized receiver configured exclusively for receiving access codes. Preferably, the specialized receiver is connected directly to the user's computer or other device used for accessing the wide area network, and any access codes received are passed automatically to the code originator via the user's network connection, thereby making the verification process more convenient for the user, and more secure for the originator.

In a related embodiment, the specialized device confirms receipt of each access code by transmitting a confirmation signal back to the broadcast source or other suitably placed receiver. The confirmation, including a unique, randomly generated confirmation code, is supplied to the original host (provider of the access code). The user then supplies the confirmation code and the access code through the user's network connection, and the user is validated only if all codes match the host's records. In the alternative, or in addition, the host sets a very limited life for the access code, such as less than ten seconds, as measured from the time that a confirmation is received. The specialized receiver device is preferably configured to automatically send the access code via the network connection immediately after transmitting the confirmation. Each of these methods discourages users from subverting the method by stationing a receiver (such as one belonging to another user) in the location of a false purported location to receive an access code, and then using the access code from a connection at a different location.

A more complete understanding of the method for verifying a geographical location of a user of a wide area network will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method and system for verifying a geographical location of a user of a wide area network. The method can be quickly and cost-effectively implemented using presently available equipment, and can be implemented without requiring dedicated equipment at the client side.

Figure 1:
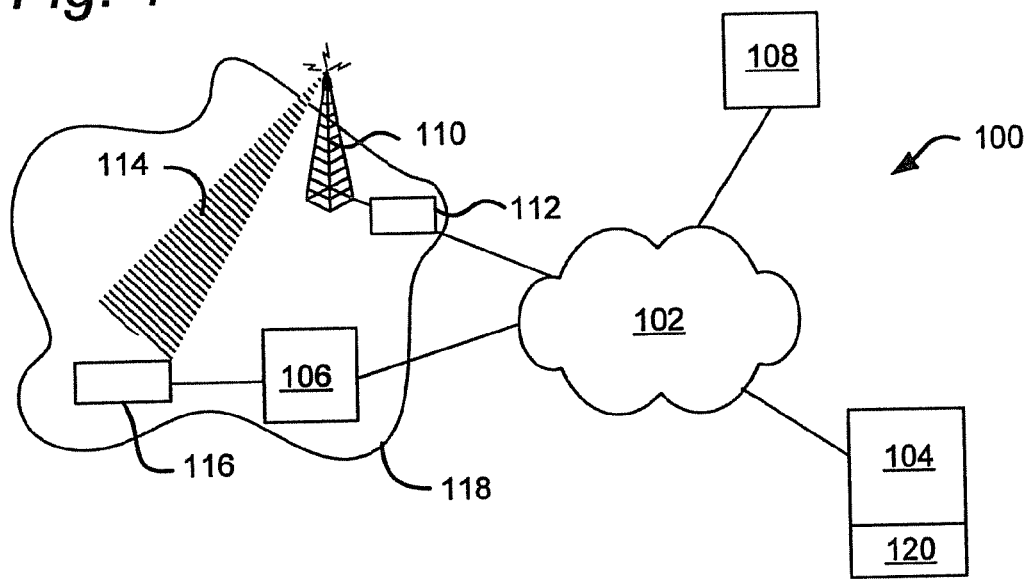
FIG. 1 is a diagram of an exemplary system for verifying a geographical location of a user of a wide area network.

FIG. 1 shows an exemplary system 100 for implementing a method according to the invention. System 100 comprises a wide area network (WAN) 102, such as the Internet, connected by communication links as known in the art to user devices 106 and 108 and to a host computer 104, which is in turn connected to a computer memory 120. Each of user devices 106, 108 may comprise any suitable client device as known in the art for connecting to the wide area network, including but not limited to a personal computer. In an embodiment of the invention, wide area network 102 is the Internet, but the invention is not limited thereto. It should be apparent that a large plurality of user devices and host computers may be simultaneously connected to the wide area network through a variety of different communication links, and that host and client devices may be configured similarly. Furthermore, the user and host devices may be connected through a variety of different communication links, and may be widely dispersed, such as in various locations throughout the world. The wide area network 100 is configured such that when a user device communicates with a host device, the host device is able to determine a static network address, such as an IP address, through which the user device is connected to the wide area network. The network address preferably will remain static for at least as long as a particular user device remains connected to the wide area network.

System 100 further comprises a broadcast controller 112 connected to wide area network 102 and to a broadcast network including at least one transmission device 110. The transmission device 110 may comprise any suitable device for broadcasting a signal 114 over a defined area, such as area 118. The shape and size of area 118 is determined by factors such as the type of transmission device 110, the characteristics of the broadcast signal 114, the sensitivity of the signal receivers, and the topology of terrain within area 118. By consideration of factors such as these, the defined area preferably is capable of being determined with a precision not less that the desired precision for locating the user device 106. System 100 is not limited to a single controller 112 or broadcast network, and multiple controllers, transmission devices, and broadcast networks may be connected to host 104, without departing from the scope of the invention. Access to multiple broadcast paths advantageously may provide greater and more reliable geographic coverage.

The terms "broadcast" or "broadcasting" as used herein are not limited to wireless transmission methods such as used for radio or television, and include any transmission method that provides a signal over a defined area. For example, scanning a focused or coherent beam over a defined area is a type of broadcast, as the term is used herein. For further example, transmitting a signal using a cable or satellite network of limited size, where the signal is only available to receivers within the limited network area, is another type of broadcast. Signal 114 may be configured for a cellular phone broadcast, a wireless pager broadcast, a UHF television broadcast, a VHF television broadcast, an AM radio broadcast, an FM radio broadcast, a shortwave radio broadcast, a CB radio broadcast, a microwave broadcast, a cable television broadcast, a satellite broadcast, or any other suitable broadcast. Signal 114 may further be a focused beam of radiation, such as a microwave beam, or a beam of coherent radiation, such as a laser beam. Such beams may be scanned over area 118 to locate suitable receivers within the area, and paused on suitable receivers for long enough to transmit information.

Controller 112 may be any suitable device or system for controlling the signals broadcast from transmission device 110 and like devices in its broadcast network. Controller 112 may be directly connected to network 102, or connected through a suitable interface (not shown). In whatever manner that it is connected, controller 112 is capable of communicating with host computer 104.

Some user devices connected to network 102, such as user device 106, are located within the defined area 118. Others, such as user device 108, are located outside of area 118, and are not capable of receiving signal 114 from transmission device 110. User device 106 is connected to a suitable receiver 116. Receiver 116 is preferably configured to scan for signal 114 at selected times, and to receive information from host computer 104 directed to user device 106 via signal 114. For example, signal 114 may comprise a continuous repeating digital signal. Receiver 116 may be configured to parse each cycle of information for an information packet addressed to the specific receiver 116 or user device 106. When an addressed packet is found, the packeted information is sent to the user device 106. Many other methods for receiving 114 may be used.

In an embodiment of the invention, receiver 116 also includes an antenna or other broadcast device for broadcasting a confirmation signal back to host computer 104. A confirmation signal (not shown) may be received and decoded by controller 112, and any information contained therein dispatched back to host 104 via network 102. In the alternative, the confirmation signal may be received by a different receiver not connected to controller 112, or by a receiver connected directly to host 104.

Figure 2:
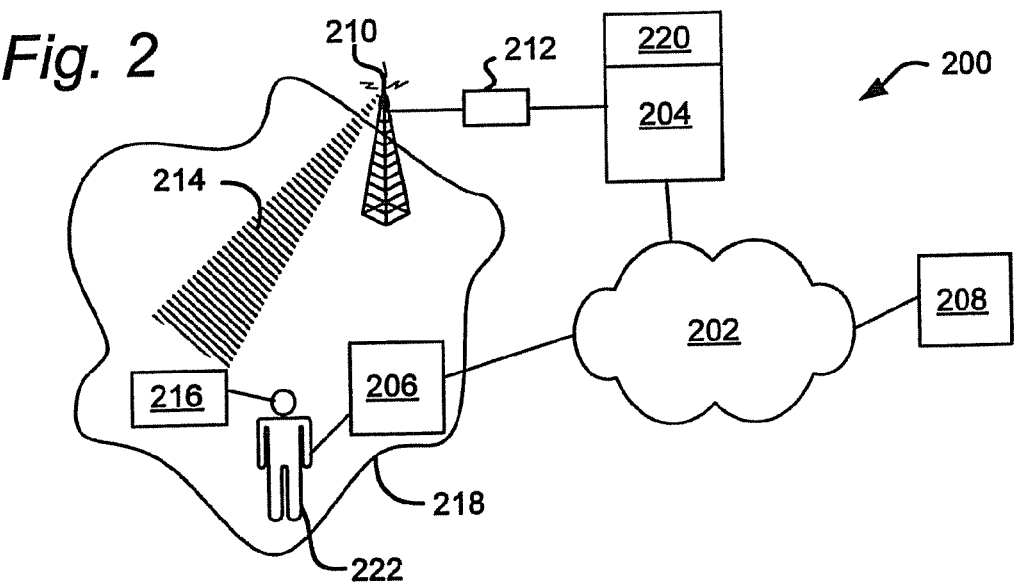
FIG. 2 is a diagram of an exemplary system for verifying a geographical location of a user, according to an alternative embodiment of the invention.

System 200, shown in FIG. 2, is in most respects similar to system 100. Wide area network 202 of system 200 is like network 102 of system 100, host 204 is like host 104, and so forth with corresponding elements indicated by corresponding lowest two digits of the numerals. System 200 differs from system 200 in chiefly two independent aspects, as described below. The combination of these aspects in system 200 is merely exemplary, and different aspects of systems 100 and 200 may be combined in various ways.

According to a first different aspect of system 200, receiver 216 is not connected to client device 206. Instead of information being passed directly from the receiver 216 to user device 206, information is passed by the human operator network (user) 222. For example, receiver 216 may comprise an ordinary television set tuned to a designated frequency. User 222 reads information from the television set and enters the information into client device 206. The information may then be provided to host computer 204 via wide area network 202, where it can be compared to information stored in memory 220. Even if equipped with a suitable receiver, the user of device 208 is outside the range of signal 214 from transmission device 210 (i.e., outside of area 218), and thus cannot receive the information available to user 222. Instead of a television, receiver 216 may comprise a AM/FM radio, a CB radio, a wireless or "cordless" phone, a pager, a cellular phone, a shortwave radio, or any other suitable receiver. Advantageously, no dedicated receiver such as receiver 116 is required by system 200. Disadvantageously, the involvement of the human operator 222 is required.

According to a second different aspect of system 200, host 204 is directly connected to controller 212 and transmission device 210, instead of being connected indirectly through wide area network 202. Direct connection offers the advantage of faster response times for the broadcast signal 214. Disadvantageously, it may require significantly more capital expense to set up a direct connection with broadcast systems having the desired geographic reach. It may be advantageous, therefore, to provide host 204 with direct connections to selected transmission devices and broadcast networks, and indirect connections to others.

Figure 3:
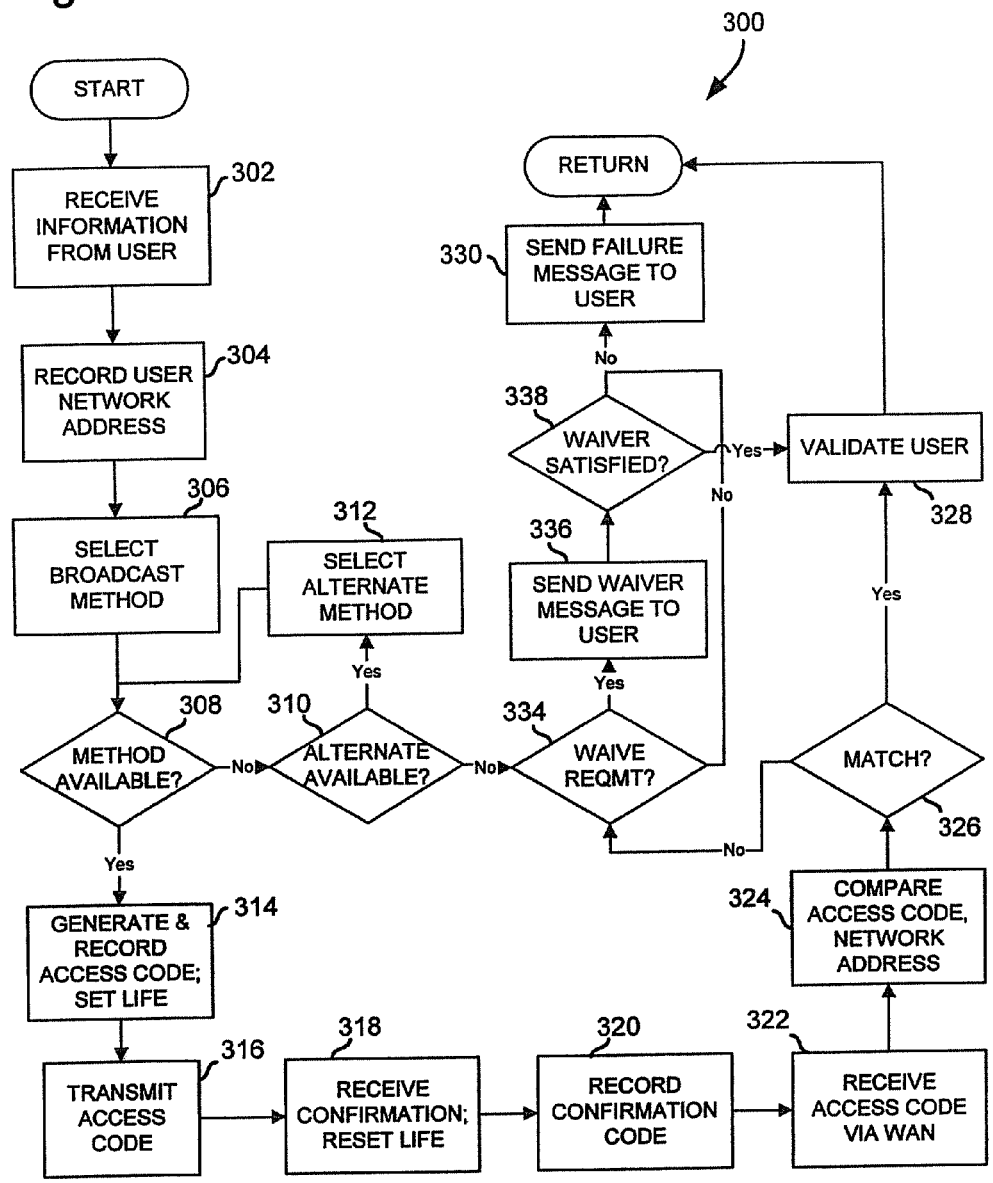
FIG. 3 is a flow diagram showing exemplary steps of a method for verifying a a geographical location of a user of a wide area network, to be performed by a network host.

FIG. 3 is a flow diagram showing exemplary steps of a method 300 for verifying a geographical location of a user of a wide area network, to be performed by a network host connection to a system such as systems 100, 200. One skilled in the art will be able to write program instructions for implementing method 300 on a general purpose computer connected to a wide area network, using a variety of known programming languages and techniques. At initial step 302, information is received from a user via a wide area network. The information from the user includes a purported geographical location of the user. Preferably, the information also includes other user identifying information, information about the receiver device or devices accessible to the user, and the user's consent to have the purported location geographical location verified. The purported geographical location may be in the form of a street address, coordinates of longitude and latitude, a town, county, state, or other politically defined region, or in any other definite form with the desired degree of specificity. Typically, the information is provided by the user in connection with a request for access to a host's products or services.

At step 304, the user's network address is recorded. For example, in an Internet environment, the user's IP address would be recorded. The user's network address is unique, and static for at long as the user remains continuously connected to the wide area network.

At step 306, a broadcast method is selected from among available broadcast methods in the user's purported geographic area for which the user is equipped to receive a signal. The host determines whither the user is able to receive a broadcast by selected method in the purported area, at step 308. For example, the host may query a controller of a selected broadcast method to determine whether a transmission device is available to cover the desired area. The queried controller may "ping" a receiver in the area, to confirm that the transmission device is operational. If a selected method is not available, the host similarly determines whether an alternate method is available at step 310. If an alternate method is available, a suitable alternate is selected at step 312 and again tested at step 308. If no suitable broadcast method is available, a failure routine is preferable entered at step 334, discussed below.

When a suitable broadcast method is selected and confirmed operational, the host generates and records an access code at step 314. Preferably the access code is a randomly generated sequence of characters, optionally of random length. In addition, a limited life (period for which the access code will be accepted by the host) may be assigned to the access code at step 314. After expiration of the code life, the access code is no longer usable for matching, i.e., for validation of the user. Code life may vary depending on factors such as the transmission method and the user's method of receiving the code. For example, a longer life may be assigned if the user will be receiving and resending the code manually.

At step 316 the access code is transmitted for broadcasting in a defined region including the user's purported location. Preferably, associated information accompanies the code, such as a user ID, the user's purported location, and code life. The code and associated information may be transmitted via the wide area network to a broadcast controller, or by some other method. The broadcast controller then causes the signal to be broadcast in the defined region. In circumstances where the controller controls a network of transmission devices, the controller preferably selects the transmission device or devices closest to the user's purported location for broadcasting the access code. In the alternative, or in addition, the controller may determine a signal strength so that the broadcast does not extend beyond the defined region. Any method for directing and limiting the signal to a defined geographic region may be used.

Steps 318 and 320 are optional steps for independently confirming that the user has received a broadcasted access code. These steps are appropriate when the user is equipped with a specialized receiver that is configured to automatically generate a confirmation signal. In some systems, the user may generate a confirmation signal manually. Also, some users of a system may be capable of sending a confirmation signal, while other users of the same system are not. In systems that support a confirmation signal, and for users capable of sending a confirmation signal, a confirmation is received at step 318. Confirmation may be received by any method independent of the user's network connection, For example, confirmation may be received by a receiver connected to the broadcast controller that broadcast the access code, and relayed to the host via the wide area network. At the time a confirmation is received, the host may set or reset a code life for the access code. This is particularly useful for enhanced security where the user is equipped with a specialized receiver configured to automatically send an independent confirmation and to return the access code via the user's network connection. In such circumstances the code life may be very brief, such as a few seconds.

A confirmation signal may additionally include a confirmation code. A confirmation code is a unique, user generated code, preferably a randomly generated code. It is particularly useful when generated automatically by a user's device. If the confirmation signal includes a code, the code is recorded by the host at step 320.

The user is preferably instructed to transmit the access code back to the host via the user's network connection, immediately receiving the code via a broadcast. In addition, the user may transmit associated information with the code, such as a user ID or confirmation code. In an embodiment of the invention, the user's transmission of the access code is automatically performed by the user's network device in cooperation with the user's receiver. By this method, a very fast transmittal may be accomplished. At step 322, the host receives the access code from the user (i.e., the user access code) via the wide area network. When the host receives the user access code, the host records the network address from which the code was received (i.e., a second network address). In addition, the host may record the time at which the user access code was received, for methods making use of access codes having limited lives. If present, a confirmation code, user ID, and other information associated with the user access code may also be recorded.

At step 324, the host compares the user access code to the access code first generated by the host, and the second network address to the first network address from which the user information was received in step 302. Various comparison methods may be used. For example, the first network address may be stored in association with the host-generated access code, and a host database of access codes may be searched for a match with the user access code. If a match is found, the network address associated with the matched code may then be compared to the second network address. This method does not require use of a user ID for matching purposes. In the alternative, the host-generated access code may be stored in association with a user ID, and compared to a user-supplied access code associated with the same user ID. Various other search and comparison methods may be employed.

In addition, it may be desirable to compare other values at step 324. For example, a confirmation code supplied by the user via the wide area network may be compared to the confirmation code recorded at step 320. In the alternative, or in addition, the host may determine whether or not the user access code is still valid, based on a predetermined code life.

If a match between all required parameters is found at decision step 326, the user is validated at step 328. At minimum, required parameters include the access codes and the network addresses. If the user access code is deemed expired, no match is possible. Other parameters for matching include the confirmation codes. Validation at step 328 signifies that the user is deemed qualified by the host. The scope and extent of the qualification may vary as desired by the host. The validation may be associated with a particular user ID, with a particular network address, or with any other parameter or combination thereof, as desired. If all required parameters are not matched at step 326, a failure routine is entered at step 334. The failure routine may also be entered by way of step 310, as previously discussed.

In some circumstances, the host may waive the requirement for a match at step 326. A decision regarding the possibility of waiver may be made at step 334. If a waiver is deemed possible, a message concerning the conditions of the waiver is optionally sent to the user at step 336. For example, the user may be required to supply additional identifying information. If the host determines at step 338 that the user has satisfied the conditions of the waiver, the user is validated at step 328. Otherwise, or if the waiver is not deemed possible at step 334, the user is provided with a failure message at step 330, preferably including a notice that the user has not been validated.

Figure 4:
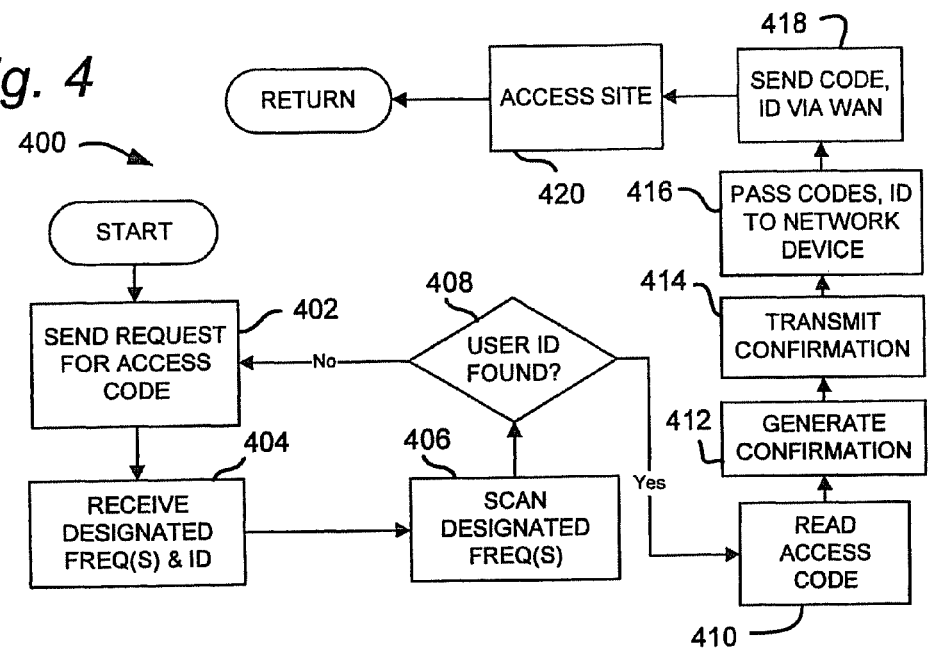
FIG. 4 is a flow diagram showing exemplary steps of a method for verifying a a geographical location of a user of a wide area network, to be performed by a network user or client.

FIG. 4 is a flow diagram showing exemplary steps of a method 400 for verifying a geographical location of a user of a wide area network, to be performed by a network user or client. The method is particularly suitable for use with a specialized receiver device connected to a user's network device. The receiver and network devices may cooperate to perform the steps of method 400. Although the receiving device is referred to as a receiver, it is preferably also has transmitting capabilities. At step 402, the user connects to the desired host via a wide area network and sends a request for an access code to the host. The host determines a broadcast method and user ID. These are received by the user's network device at step 404, and passed to the connected receiver. The broadcast method includes designation of one or more frequencies for receiving the access code. The receiver then scans the designated frequency or frequencies until a transmission with the user ID is received, as indicated at steps 406 and 408. If the user ID is not detected within a predetermined time, the request may be repeated at step 402.

If the user ID is detected at step 408, the access code is received by the receiver at step 410, and decoded as necessary. At step 412, the receiver generates a confirmation signal, which may include an encoded confirmation code, as previously discussed. The receiver transmits the confirmation at step 424, such as by broadcasting on a predetermined frequency, or on a frequency designated by the host. At step 416, the receiver passes the access code and any associated information, such as the user ID and confirmation code, to the network device. The network device sends the access code and any associated information to the host through the network connection at step 418. After the network host accepts the access code and associated information, and validates the user, the user may access the host site at step 420.

Figure 5:
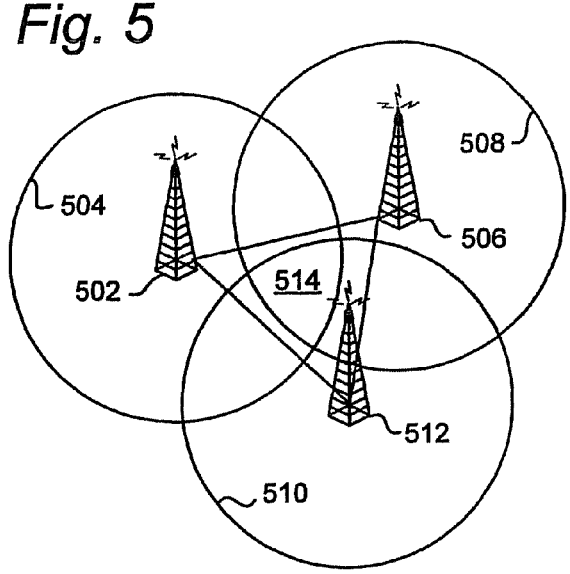
FIG. 5 is a diagram showing part of a system for verifying the location of a network user, by selecting a plurality of antennas having overlapping broadcast areas including the user's purported location.

In some cases, it may not be possible to locate a user within a region of the desired size using a single transmission device. For such cases, it may be desirable to use multiple transmission devices with over lapping broadcast regions. FIG. 5 is a diagram showing part of a system for verifying the location of a network user, by selecting a plurality of antennas 502, 506, 512 having overlapping broadcast areas 504, 508, 510 including a user's purported location. Areas 504, 508, 510 all overlap in area 514, which preferably includes the user's purported location. A separate portion or segment of the access code may be broadcast from each of the antennas 502, 506, 512. A user located in area 514 will be able to receive all three segments, and reassemble them to obtain the access code. Anyone located in any other part of the broadcast areas 504, 508, and 510 will not be able to receive all three segments of the access code, and will not be able to obtain the access code. Thus, by segmenting the access code and separately transmitting the segments from antennas with overlapping broadcast areas, a host may improve the precision with which a user may be located. One skilled in the art may devise other methods for improving the precision of location.

Having thus described a preferred embodiment of method for verifying a geographical location of a user of a wide area network, it should be apparent to those skilled in the art that certain advantages of the within system have been achieved, It should also be appreciated that various modifications, adaptations, and alternative embodiments thereof may be made within the scope and spirit of the present invention. For example, methods that utilize the limited geographic range of radio, microwave, and like signals have been illustrated, but it should be apparent that the inventive concepts described above would be equally applicable for use with any communication signal that can only be received within a definable physical or geographic area. The invention is further defined by the following claims.

What is claimed is:

1. A method for verifying a geographical location of a first computing device, the method comprising:
    sending a request for information usable to verify a geographic location of a first computing device, wherein the request includes a purported geographic location of the first computing device and is sent from the first computing device to a second computing device via a first network;
    receiving at the first computing device an access code via a data signal that is broadcast to a geographic area including the purported geographic location; and
    sending the access code from the first computing device to the second computing device, the access code confirming that the first computing device is located in the geographic area.

2. The method of claim 1, further comprising scanning a designated frequency band until the access code is received.

3. The method of claim 2, wherein the scanning is performed until a user ID is received via the designated frequency band.

4. The method of claim 1, further comprising decoding the access code at the first computing device.

5. The method of claim 1, further comprising transmitting a confirmation code from the first computing device to the second computing device.

6. The method of claim 1, wherein the access code is received by the first computing device via a wireless receiver coupled to the first computing device.

7. The method of claim 1, wherein the first computing device comprises a wireless receiver configured to receive the access code.

8. The method of claim 1, further comprising sending an ID for the first computing device to the second computing device with the access code.

9. The method of claim 1, further comprising sending the access code from the first computing device to the second computing device via a wide area network.

10. The method of claim 1, further comprising receiving access to content in response to sending the access code to the second computing device.

11. The method of claim 1, wherein the first computing device receives the access code in segments from different broadcasts.

12. The method of claim 11, further comprising assembling the segments to determine the access code.

13. A computing device comprising:
    a connector for coupling to a first network; and
    a wireless receiver configured to receive a broadcast code via a transmission path separate from the first network, wherein the computing device is configured to obtain the broadcast code via the wireless receiver for confirming that the computing device is located in a geographic range of a broadcast by which the broadcast code is transmitted.

14. The computing device of claim 13, wherein the computing device is further configured to scan a designated frequency band using the wireless receiver until the broadcast code is received.

15. The computing device of claim 14, wherein the computing device is further configured to scan until a user ID is received via the designated frequency band.

16. The computing device of claim 13, wherein the computing device is further configured to decode the broadcast code.

17. The computing device of claim 13, wherein the computing device is further configured to transmit a second code from the wireless receiver to a host computing device after receiving the broadcast code.

18. The computing device of claim 17, wherein the computing device is further configured to transmit the second code by broadcasting at a predetermined frequency.

19. The computing device of claim 13, wherein the computing device is further configured to broadcast the confirmation code at a frequency designated by a host.

20. The computing device of claim 13, wherein the computing device is further configured to provide an identifier for the computing device to a remote host that initiates transmission of the broadcast code.

21. The computing device of claim 13, wherein the computing device is further configured to provide the broadcast code to a remote host via the first network.

22. The computing device of claim 13, wherein the computing device is further configured to obtain the broadcast code in parts from different broadcasts to the wireless receiver.

23. The computing device of claim 22, wherein the computing device is further configured to process the parts to determine the broadcast code.

24. A tangible computer-readable media comprising instructions encoded thereon, the instructions configured for execution by a computing device in order to cause the computing device to perform operations comprising:
    sending a request for information usable to confirm a geographic location of the computing device to a remote computing device via a computer network;
    receiving a first code from the remote computing device via a wireless receiver locally connected to the computing device and not via a connection to the computer network; and
    sending the first code from the computing device to the remote computing device, the first code confirming that the wireless receiver is located in a geographic range of a broadcast by which the first code was transmitted.

25. The tangible computer-readable media of claim 24, wherein the instructions are further configured to cause the computing device to scan a designated frequency band using the wireless receiver until the first code is received.

26. The tangible computer-readable media of claim 25, wherein the scanning is performed until a client identifier is received via the designated frequency band in association with the first code.

27. The tangible computer-readable media of claim 24, wherein the instructions are further configured to cause the computing device to decode the first code at the computing device.

28. The tangible computer-readable media of claim 24, wherein the instructions are further configured to cause the computing device to transmit a confirmation code from a locally-connected transmitter to the remote computing device.

29. The tangible computer-readable media of claim 28, wherein the instructions are further configured to cause the computing device to transmit the confirmation code by broadcasting at a predetermined wireless frequency.

30. The tangible computer-readable media of claim 28, wherein the instructions are further configured to cause the computing device to transmit the confirmation code by broadcasting at a frequency designated by the remote computing device.

31. The tangible computer-readable media of claim 24, wherein the instructions are further configured to cause the computing device to send an identifier of the computing device to the remote computing device with the first code.

32. The tangible computer-readable media of claim 24, wherein the instructions are further configured to cause the computing device to send the first code from the computing device to the remote computing device via the computer network.

33. The tangible computer-readable media of claim 24, wherein the instructions are further configured to enable the computing device to receive access to content associated with the remote computing device after sending the first code to the remote computing device.

34. The tangible computer-readable media of claim 24, wherein the instructions are further configured to cause the computing device to obtain the first code from the wireless receiver in segments at different times.

35. The tangible computer-readable media of claim 34, wherein the instructions are further configured to cause the computing device to assemble the segments to determine the first code.

* * * * *